United States Patent Office 3,426,731
Patented Feb. 11, 1969

3,426,731
METHOD AND APPARATUS FOR RAISING ANIMAL STOCK
Nils H. Skoglösa, Uttran, Sweden, assignor to Alfa-Laval AB., Tumba, Sweden, a corporation of Sweden
Filed Sept. 13, 1966, Ser. No. 579,135
Claims priority, application Sweden, Sept. 27, 1965, 12,522/65
U.S. Cl. 119—15                9 Claims
Int. Cl. A01k 1/00

ABSTRACT OF THE DISCLOSURE

The cows or other stock animals are maintained on a series of transport devices where the animals normally live, at least one on each device, and each transport device is moved independently of the others to and from a series of separate tending stations where different normal tending operations are performed. Each transport device has service means for supplementing the tending stations to accommodate an animal in normal living, and a special station is provided to which each transport device is movable selectively for treatment of an irregularity, such as illness, experienced by an animal.

THE DISCLOSURE

Figure 1:
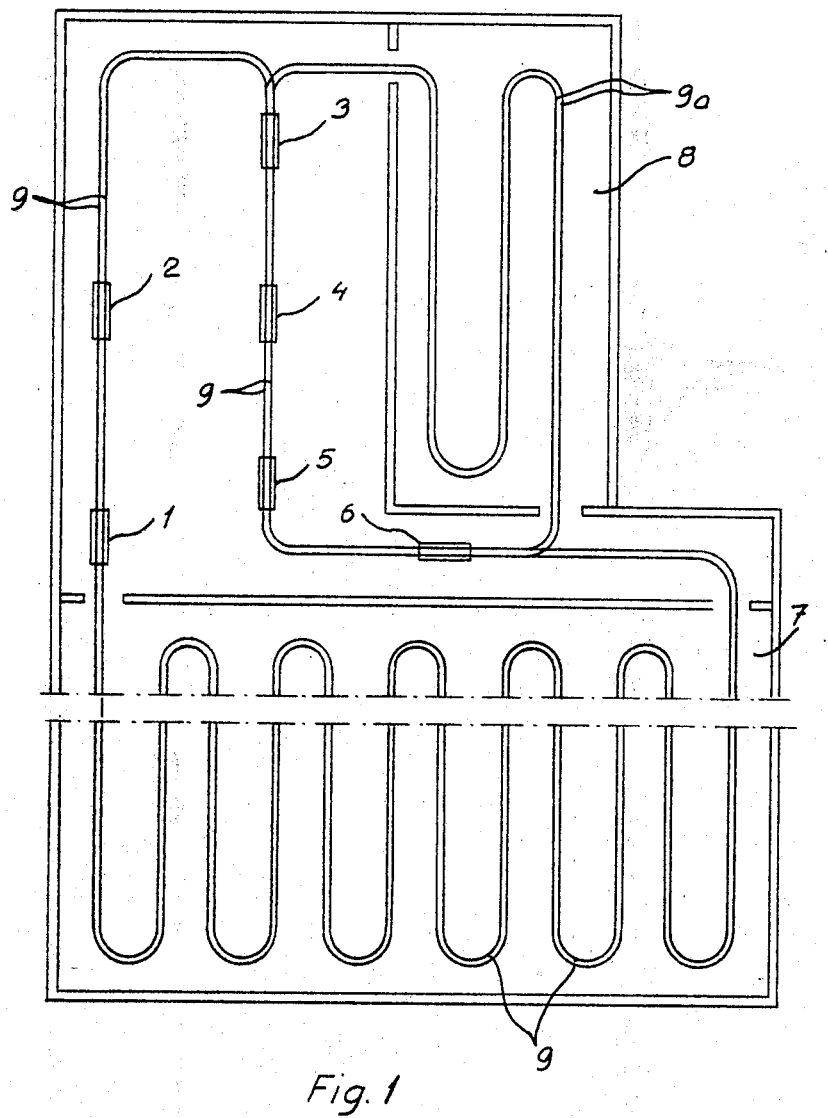

The present invention relates to a method and apparatus for raising animal stock. The method is particularly characterized in that the animals, one by one or in groups, are transported from one tending station to another in a series of tending stations, and different tending operations occurring in connection with the stock-raising are performed at the different stations.

According to a preferred embodiment of the invention, the transport of each animal to the different tending stations in sequence is effected by a movable device where the animal normally lives constantly, such as an open-sided trolley, a box or a cage.

When endeavoring to decrease the costs of production in connection with stock-raising, there are in particular two problems encountered, namely, how to decrease the human participation in the work, and how to adjust the feeding of the animals so that it will correspond to the production obtained or aimed at.

One object of the present invention is to contribute effectively to the solving of the above-noted problems. The essential advantages gained from the invention will be apparent from the following description. These advantages are particularly outstanding in connection with the tending of milk-producing cows, and the description will therefore deal with that branch of stock-raising. This does not mean, however, that the invention is limited to milk production. On the contrary, it may advantageously be adapted also in connection with other branches of stock-raising, for instance, the raising of pigs and cattle for meat production.

In cattle-sheds equipped in the traditional way, the cows are tethered in a long row. The feeding may be done by mechanical means, but it would present greater difficulties to feed each animal in proportion to its milk yield. When milking, the personnel moves the teat-cups from one cow to the next and connects them to the pipelines extending through the cattle-shed of large pipeline milking plants. This involves human labour. In such cattle-sheds it is also difficult to perform the dung removing in an efficient manner. It is true that mechanical devices are utilized more and more, but when it comes to keeping large surfaces clean and transporting the manure substantial distances, such devices frequently become clumsy and also require complementary manual work.

In order to simplify the handling in the cattle-shed, so-called "loose housing" has been introduced. The cows then move about freely in the cattle-shed, which is provided with a latticed floor. The manure is treaded down by the cows themselves into a space arranged below the floor, this space being emptied either by mechanical means or by means of so-called "flowing" dung removing. Hay and similar coarse fodder are fed by mechanical means to special feeding tables. Further, the cows have stalls at their disposal, where they can lie down when they need rest and sleep. When it is time for milking, the cows gather in a fixed milking plant through which they pass in groups and where they stand in especially shaped stalls. During its stay in one of those milking stalls, each cow receives a quantity of concentrate in a manger of the stall. The portioning is performed mechanically and it is the intention that the cow should eat the concentrate during the milking.

Although the loose housing has great advantages, it nevertheless has certain serious disadvantages. For example, such housing makes it difficult to arrange an individual feeding of the animals. It may even happen that the cows have too little time to eat the measured quantity of concentrate during the milking and have to leave it. Further, the latticed floor that is constantly soiled with the manure is unattractive. An effective cleaning of the cattle-shed, which has to be undertaken now and then, involves much work.

Figure 2:
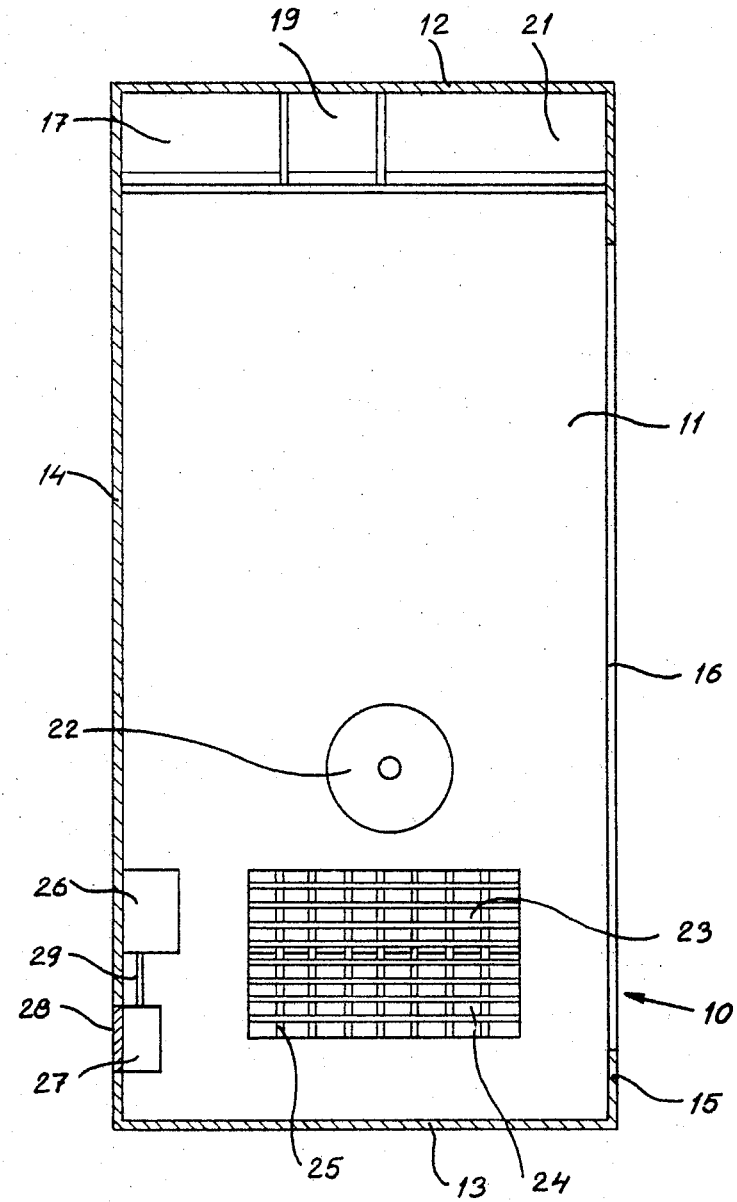

By employing the method according to the present invention, the above-mentioned drawbacks associated with the earlier methods are eliminated to a great extent and, in addition, several important sound measures can now be carried into effect. This invention will be easily understood from the following description of an embodiment of the same, with reference to the accompanying drawings in which:

FIG. 1 is a schematic view of a cattle-shed, showing the different tending stations located along a track for the animal transport devices, and FIG. 2 is a horizontal sectional view of one of the transport devices.

According to this embodiment of the invention, each of the cows normally lives constantly in a movable transport device 10 (FIG. 2) in the form of a rail-bound box which is roomy, about 3 meters long and 1.2 meters wide, and corresponds approximately to an ordinary stall. The transport device 10, by means of a program-controlled driving arrangement to be described presently, is moved along a track 9 which serves a series of tending stations 1 through 6 in the cattle-shed, as shown in FIG. 1. At each one of these tending stations, the cow is subjected to one of the tending operations which occur in the cattle-shed. The first tending station 1, to which the cow is transferred in its box in the morning, is a washing station. Here the teats and the udder of the cow are washed by means of a shower device followed by drying by means of hot air. At the next tending station 2, the cow is milked, the teat-cups of the milking unit being applied to the teats by an attendant on duty at this station. The box is advanced along the track 9 during this milking operation, and the attendant applies the teat-cups of another milking unit to the cow in the nearest following box. The teat-cups are automatically removed, or possibly manually on smaller farms, on the way to the next station, when the milking has been completed.

At the third station 3, a container in the box is automatically filled with drinking water. At the fourth station 4, the cow is fed with a predetermined quantity of concentrate corresponding to the milk yield of the cow. The yield has been ascertained at the milking station, and corresponding information has been transmitted to a measuring instrument (not shown) at the feeding station 4. The concentrate is received in a manger arranged in the box and will consequently follow the cow on her further transfer to the fifth station 5, where the cow is fed a quantity of hay or other coarse fodder that has been weighed out as well, this fodder also being collected in a manger arranged in the box. In consequence, the cow will now be able to eat all her fodder at the rate that will suit her during the further transfer of the box.

The box is provided with a container for the collection and keeping of the manure. This container is emptied and cleaned automatically at the sixth station 6, and the box is thus constantly kept clean and neat, like the cattle-shed as a whole. The cow is then given an opportunity to rest and ruminate her food during the transfer to the next station.

The cycle described above is repeated partly or completely a desired number of times per 24 hours. For instance, milking three times per 24 hours is advantageous for the milk yield but could hardly be considered practical in connection with hitherto known tending methods. At suitable points along the track 9, sleeping stations are provided in a dark chamber 7, where the cows are given an opportunity to sleep.

The boxes are periodically taken out of circulation for thorough cleaning and sterilization with steam in a tunnel (not shown). A box is also taken out of the program-controlled circulation and shunted to a track 9a in a special department 8 of the cattle-shed, when the cow in that box experiences an irregularity such as illness, calving, etc.

Referring now to FIG. 2, the animal transport device comprises an open-sided box 10 provided with suitable wheels (not shown) adapted to roll on the track 9–9a (FIG. 1). The box 10 includes a bottom 11, a front end wall 12, a rear end wall 13, a side wall 14, and an opposite side wall 15 having an opening 16 to provide ready access for applying and removing the teat-cups, etc. In the front end of the box are service means including a water container 17 which may be filled through a funnel 18 from outside the box, at the station 3 (FIG. 1). Next to this container is a container 19 for the concentrate supplied at station 4 (FIG. 1). The container 19 may be filled from outside the box through a suitable chute 20. Next to container 19 is a container 21 for the hay or other coarse fodder, which is introduced at station 5 through side opening 16a.

The floor 11 is provided with additional service means including a drain sump 22 for draining off the water from the washing operation at station 1 (FIG. 1) and also including a recess closed at the bottom by two swinging doors 23 and 24, which may be opened at station 6 (FIG. 1) to discharge the manure. This recess is covered by a grill 25 through which the manure is treaded down by the cow.

An electric motor 26 is connected through a suitable drive (not shown) to at least one of the wheels on which the box 10 rides, so that energization of the motor causes the box to move along the track 9 (FIG. 1). A programming device 27 is accessible for adjustment through a door 28 in the side wall 14 and has an operative connection 29 to the electric motor 26. The device 27 may be of any conventional type which can be set to energize a motor intermittently for different selected periods of time and with variations in the intervals between successive energizations, in accordance with a predetermined program. Thus, under control of the programming device 27, the cow is transported in the box 10 from one station to the next as shown in FIG. 1, after a predetermined dwell period at each station. The electric current for operating the programming device and the motor may be supplied to the box 10 in any conventional manner, as from an overhead wire through a trolley pole or through a contact shoe riding on a suitably guarded "third rail."

The present invention makes it possible to revolutionize the cattle-shed operations by transferring the cow in her movable device to fixed tending stations where the tending operations can be practically completely mechanized and automated. As each tending operation has been localized to a single fixed station, it is possible to provide this station with highly advanced arrangements which would be too expensive to utilize in connection with the tending operations hitherto known, for it would then require a whole series of such arrangements for each operation, as well as manual attendance.

These greatly developed arrangements make it possible to tend the animals in a highly efficient manner by means of individual treatment. Each cow can get exactly the amount of fodder, the kind of milking and other treatment that she will need with reference to her age, weight, lactation stage and so on. Aside from the savings that can be made on account of decreased human labor, the really large profits of the system derive from the possibility of following closely the utilization of the fodder, which is the dominating factor in connection with the earning power of milk production.

As has been mentioned above, the invention is not limited to the tending of milk-cows, but relates to the tending of all kinds of live stock. Also, it is not limited to the method of transferring the animals one by one, each in its own movable device, between the different tending stations. In some cases, as in connection with pig-breeding, it is suitable to transfer the animals in groups in larger movable units, the animals being then grouped according to age, with reference to the desired type of the end product, etc.

I claim:

1. Apparatus for raising animal stock, which comprises a series of normal tending stations having, respectively, different tending means for performing different normal tending operations, a plurality of animal transport devices movable in independently of each other to and from said stations successively, service means on each transport device for supplementing said tending stations to accommodate an animal in normal living, and a special station to which each transport device is movable selectively for treatment of an irregularity experienced by an animal living on said device.

2. Apparatus according to claim 1, in which said service means include means for collecting and holding fodder.

3. Apparatus according to claim 2, in which the tending means at one of said stations is operable to supply fodder to said collecting and holding means.

4. Apparatus according to claim 1, in which said service means include means for collecting and holding manure and operable to discharge the manure.

5. Apparatus according to claim 4, in which the tending means at one of said stations is operable to receive manure discharged from said collecting and holding means.

6. Apparatus according to claim 1, in which said service means include a container for drinking water.

7. Apparatus according to claim 6, in which the tending means at one of said stations includes means for supplying drinking water to said container.

8. Apparatus according to claim 1, comprising also means for moving said devices from one station to next according to a predetermined program.

9. In the tending and raising of animal stock, the method which comprises maintaining a group of animals on a series of transport devices where the animals normally live, at least one animal on each device, moving each transport device independently of the other transport devices to and from a series of separate tending stations, performing different normal tending operations at the different tending stations, and moving a selected transport device to a special station for treatment of an irregularity experienced by an animal on the selected device.

References Cited

UNITED STATES PATENTS

| 2,358,000 | 9/1944 | Cornell | 119—14.04 |
| 3,019,763 | 2/1962 | Ferris | 119—14.03 |
| 3,103,912 | 9/1963 | Benedetto | 119—14.04 |
| 3,282,250 | 11/1966 | Cain | 119—14.04 |

FOREIGN PATENTS 377,580   6/1964   Switzerland.

ALDRICH F. MEDBERY, *Primary Examiner.*

U.S. Cl. X.R.

119—14.04